(12) United States Patent
Cheng et al.

(10) Patent No.: US 10,326,711 B2
(45) Date of Patent: Jun. 18, 2019

(54) APPARATUS AND METHOD FOR USING MULTIPLE MULTI-DROP BUSES

(71) Applicant: Intel Corporation, Santa Clara, CA (US)

(72) Inventors: Albert S. Cheng, Bellevue, WA (US); Thomas D. Lovett, Portland, OR (US); Michael A. Parker, Santa Clara, CA (US); Steven F. Hoover, Hudson, MA (US); Gregory J. Hubbard, Eau Claire, WI (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 15/531,643

(22) PCT Filed: Dec. 24, 2014

(86) PCT No.: PCT/US2014/072401
§ 371 (c)(1),
(2) Date: May 30, 2017

(87) PCT Pub. No.: WO2016/105427
PCT Pub. Date: Jun. 30, 2016

(65) Prior Publication Data
US 2018/0287963 A1    Oct. 4, 2018

(51) Int. Cl.
*H04L 12/933*    (2013.01)
*H04L 12/937*    (2013.01)

(52) U.S. Cl.
CPC .......... *H04L 49/101* (2013.01); *H04L 49/107* (2013.01); *H04L 49/109* (2013.01); *H04L 49/254* (2013.01)

(58) Field of Classification Search
CPC ......... H04L 45/00; H04L 45/02; H04L 45/04; H04L 29/06; H04L 47/10
(Continued)

(56) References Cited

U.S. PATENT DOCUMENTS 5,142,565 A * 8/1992 Ruddle ................ G06F 3/16
379/88.02
5,291,480 A * 3/1994 Nimon ................ H04L 12/56
370/400

(Continued)

FOREIGN PATENT DOCUMENTS

JP    2004-280304 A    10/2004
JP    2004280304 A *  10/2004    ............. G05B 19/05

OTHER PUBLICATIONS

International Preliminary Report on Patentability dated Jul. 6, 2017 for International Patent Application No. PCT/US2014/072401, 8 pages.

(Continued)

*Primary Examiner* — Gbemileke J Onamuti
*Assistant Examiner* — Sanjay K Dewan
(74) *Attorney, Agent, or Firm* — Schwabe, Williamson & Wyatt, P.C.

(57) ABSTRACT

Apparatuses, methods and storage media associated with multiple multi-drop buses in a switch are provided herein. In some embodiments, the switch may include a multi-drop row bus to transmit a plurality of frames in a row dimension of the matrix switch and a multi-drop column bus to transmit the plurality of frames in a column dimension of the matrix switch. The switch may further include an input port to receive the plurality of frames and an output port to output the plurality of frames from the matrix switch. Other embodiments may be described and/or claimed.

24 Claims, 4 Drawing Sheets

(58) Field of Classification Search
USPC .......................................................... 370/400
See application file for complete search history.

(56) References Cited

U.S. PATENT DOCUMENTS

| | | | | |
|---|---|---|---|---|
| 5,495,474 | A * | 2/1996 | Olnowich | G06F 13/4022 340/2.6 |
| 5,530,434 | A * | 6/1996 | Kanda | G06F 13/4027 340/2.2 |
| 6,145,072 | A * | 11/2000 | Shams | G06F 15/17343 710/2 |
| 6,304,572 | B1 * | 10/2001 | Christie | H04J 3/125 370/400 |
| 6,748,473 | B1 * | 6/2004 | Shatas | G06F 13/4045 710/300 |
| 6,901,593 | B2 * | 5/2005 | Aweya | H04L 47/10 370/230 |
| 7,366,171 | B2 * | 4/2008 | Kadambi | H04L 12/46 370/389 |
| 2002/0064149 | A1 * | 5/2002 | Elliott | H04L 12/14 370/352 |
| 2004/0037278 | A1 * | 2/2004 | Wong | H04L 47/10 370/389 |
| 2016/0127267 | A1 * | 5/2016 | Kumar | H04L 49/252 370/400 |

OTHER PUBLICATIONS

International Search Report and Written Opinion dated Sep. 9, 2015 for International Patent Application No. PCT/US2014/072401, 11 pages.

* cited by examiner

APPARATUS AND METHOD FOR USING MULTIPLE MULTI-DROP BUSES

CROSS REFERENCE TO RELATED APPLICATIONS

The present application is a national phase entry under 35 U.S.C. § 371 of International Application No. PCT/US2014/072401, filed Dec. 24, 2014, entitled "APPARATUS AND METHOD FOR USING MULTIPLE MULTI-DROP BUSES", which designated, among the various States, the United States of America. The Specifications of the PCT/US2014/07240 Application is hereby incorporated by reference.

FIELD OF THE INVENTION

The present disclosure relates generally to the technical field of computer networking, and more particularly, to apparatuses and methods for using multiple multi-drop buses for computer networking.

BACKGROUND

In a tile-matrix switch, ports may be arranged in rows and columns. For example, an 8-by-8 tile-matrix switch would have the ports in eight rows and eight columns. After a frame enters an input port on a particular row and column, the switch determines the output port based on the destination address in the frame. Accordingly, the frame may then traverse the row and column to the output port.

Many tile-matrix switches may use a single driver or multi-receiver bus to deliver frames from various input ports to the destination column, and then use a set of point-to-point buses to drive the frames from the row/column intersection point down the column to the output port. The set of point-to-point buses may be wire-intensive for a high-radix tile matrix switch. Although point-to-point buses may provide a non-blocking behavior for the switch, this scheme may become non-sustainable for switches with higher radix.

The background description provided herein is for generally presenting the context of the disclosure. Unless otherwise indicated herein, the materials described in this section are not prior art to the claims in this application and are not admitted to be prior art or suggestions of the prior art by inclusion in this section.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
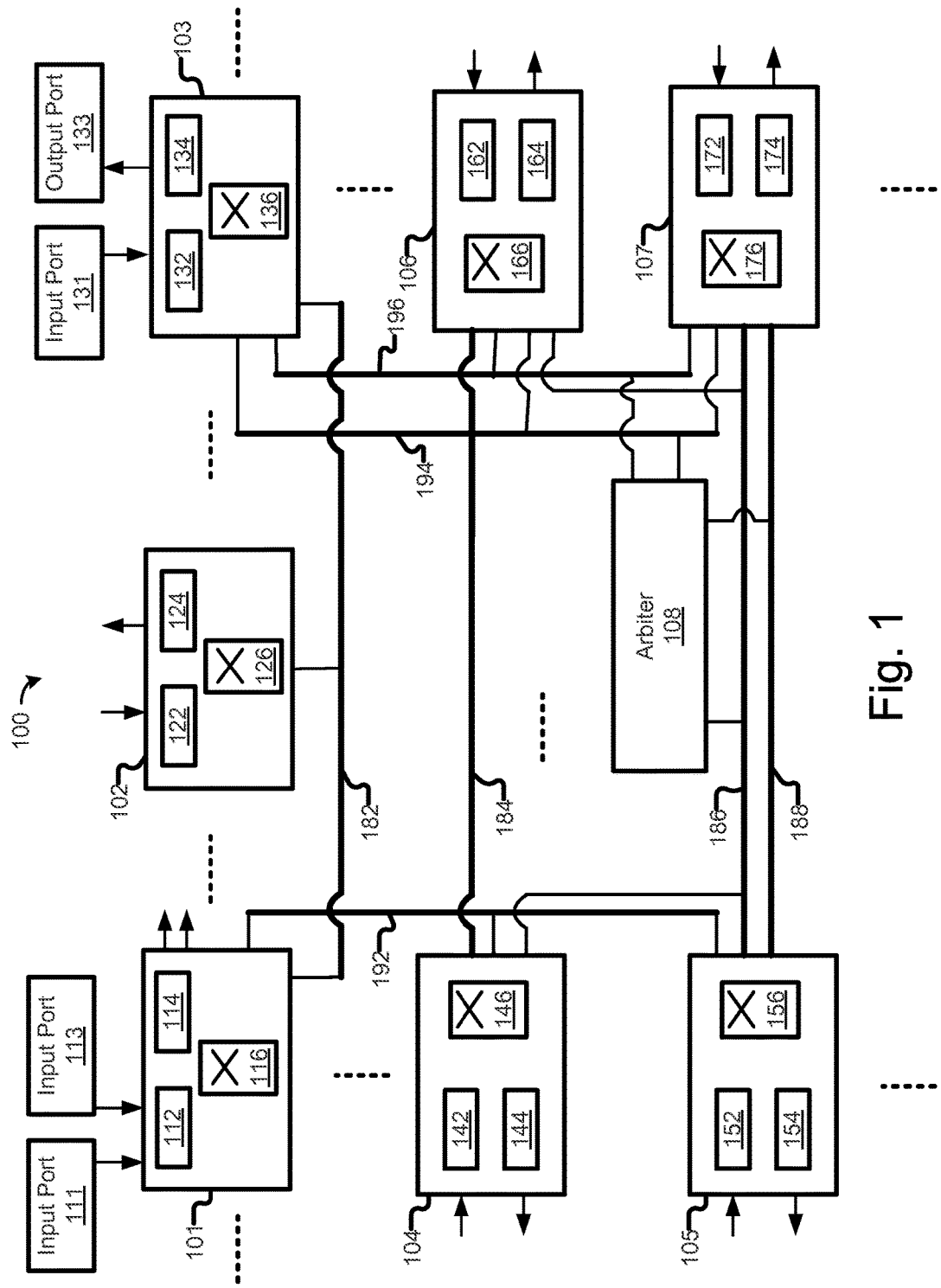
FIG. 1 is a schematic diagram illustrating an example switch configuration for using multiple multi-drop buses, incorporating aspects of the present disclosure, in accordance with various embodiments.

Apparatuses, methods, and storage media associated with multiple multi-drop buses in a switch are provided herein. In some embodiments, the switch may include a multi-drop row bus to transmit a plurality of frames in a row dimension of the matrix switch and a multi-drop column bus to transmit the plurality of frames in a column dimension of the matrix switch. The switch may further include an input port to receive the plurality of frames and an output port to output the plurality of frames from the matrix switch. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in another embodiment," "in some embodiments," "in embodiments," "in various embodiments," or the like, which may each refer to one or more of the same or different embodiments.

In embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

Referring now to FIG. 1, an example switch 100 using multiple multi-drop buses in accordance with various embodiments is illustrated. In some embodiments, switch 100 may be a tile-matrix switch with various sub-switches (hereinafter, "tiles") arranged in physical rows and columns or in X-dimension and Y-dimension. As an example, tiles 101, 102, and 103 may be arranged in the same row; tiles 104 and 106 may be arranged in another same row; and tiles 105 and 107 may be arranged in yet another same row. As another example, tiles 101, 104, and 105 may be arranged in the same column, and tiles 103, 106, and 107 may be arranged in another same column. While only a few tiles are depicted in FIG. 1 for illustrative purposes, it will be appreciated that any number of tiles may be utilized without departing from the scope of the present disclosure. In addition, in some embodiments, switch 100 may be a sub-component of a larger switch or may be part of a matrix switch.

In some embodiments, every tile (e.g., tile 103) may have an input port (e.g., input port 131) and an output port (e.g., output port 133). In some embodiments, one tile may have two or more input ports or two or more output ports. A tile (e.g., tile 103) may receive frames from its input port(s) (e.g., transmitted from another computing device) and queue frames into its input queue(s) (e.g., input queue 132). A frame in the input queue may then be forwarded by a switch module (e.g., switch module 136) from the present tile to the output queue (e.g., output queue 154) of another tile (e.g. tile 105), e.g., based on the frame's hardware address. The outgoing frames may then be output from the output port (e.g., output port 133) to, e.g., another computing device. In this way, switch 100 may be configured to switch frames (e.g., data or control frames) received from any of the input ports to any of the output ports.

In some embodiments, switch 100 may be operated at the data link layer as a layer-2 switch. Switch 100 may use any one of the known layer-2 forwarding methods, such as store and forward, cut through, fragment free, or adaptive switching. In some embodiments, switch 100 may be operated at the network layer as a layer-3 switch. Thus, switch 100 may perform some or all of the functions normally performed by a router, such as network address translation or load distribution. When switch 100 be operated as a layer-3 switch, input and output ports may be configured to receive network packets, and each tile may be configured to process the respective header of each packet, and forward the packet to its next destination, e.g., based on the network address in the packet or the hardware address in the frame. In other embodiments, switch 100 may be operated in another layer other than layers 2 and 3. As an example, switch 100 may be operated in the application layer as a layer-7 switch, e.g., forwarding data based on Uniform Resource Locator (URL). Hereinafter, frame may be used to represent the basic data unit regardless which layer switch 100 may be operated in.

In various embodiments, one or more multi-drop row buses in the X-dimension may be used in switch 100, e.g., to increase performance in the X-dimension routing. In some embodiments, a multi-drop row bus may be unidirectional. As an example, multi-drop row bus 182 may be used by tile 103 to forward frames to tile 102, tile 101, or other tiles in their row. In this instance, tile 103 may drive multi-drop row bus 182 to forward frames from right to left. In some embodiments, tile 102 may have its own respectively coupled multi-drop row bus (not shown) to forward frames from input queue 122 via its switch module 126. Similarly, tile 101 may have its own respectively coupled multi-drop row bus (not shown) to forward frames from input queue 112 via its switch module 116.

As another example, multi-drop row bus 184 may be used by tile 106 to forward frames from input queue 162 via its switch module 166. Similarly, tile 104 may have its own respectively coupled multi-drop row bus (not shown) to forward frames from input queue 142 via its switch module 146. In various embodiments, output queues, e.g., 134, 124, 114, 164, and 144, may receive frames forwarded via their respectively coupled one or more multi-drop row buses.

In some embodiments, a multi-drop row bus may be bidirectional. As an example, multi-drop row bus 182 may be also an open-collector bus where all the tiles in a row may share a row bus. In this case, each tile (e.g., tile 103, 102, or 101) may need to arbitrate for usage of multi-drop row bus 182, e.g., from an arbiter. A tile may drive the multi-drop row bus to forward its frames only when the tile gains access to the multi-drop row bus, In various embodiments, multiple multi-drop row buses in the X dimension may be coupled to and used by one input port or input queue, e.g., to further increase performance in the X-dimension routing. As an example, frames at the front of the different input queues that are on different VCs or destined to different tiles may be allowed to be moved simultaneously using different multi-drop row buses to their destination tiles. For instance, multi-drop row buses 186 and 188 may be coupled to and used by tile 107 and input queue 172 thereof to simultaneously forward frames to tile 105 and other tiles in their row. In some embodiments, switch module 176, with an integrated arbiter, may determine, between multi-drop row buses 186 and 188, which multi-drop row bus may be used to forward frames from input queue 172. In other embodiments, arbiter 108 may perform the selection function to select multi-drop row bus 186 or 188 to forward frames from input queue 172. In various embodiments, arbiter 108 may be located outsides of tiles or distributed to inside of one or more selected tiles or every tile. In various embodiments, output queues, e.g., 174 and 154, may receive frames forwarded via their respectively coupled one or more multi-drop row buses.

In some embodiments, if each tile has its own buses and does not share buses with other tiles, then each tile may have its own arbiter, e.g., integrated in the tile, to manage its buses. If a tile is sharing buses with other tiles, the arbitration may still be distributed across different tiles. As an example, tile 106 and tile 107 may share multi-drop row bus 186, and each tile may have its own arbiter. When tile 106 wants access to multi-drop row bus 186, it may ask tile 107 for permission, and vice versa. If tile 106 and tile 107 simutenously request for permission for access, then a pre-selected one, e.g., tile 106, may have priority over another. Alternately they may both randomly yield until one gets the access. In some embodiments, if a common bus is shared by multiple tiles, then the arbiter may be placed outside the tiles. Of course, the arbiter may still be placed within a selected tile. In some embodiments, the arbiter for handling the row bus arbitration and the column bus arbitration may be lumped together as one physical unit, although the arbiter may still logically conduct separate arbitrations for row buses and column buses respectively.

Additionally, in some embodiments, a token mechanism may be implemented for bus selection, where a token is passed around, e.g., between tile 106 and tile 107, for the usage of the shared bus. The token may be grabbed by one tile that wants access. The token may then be released until the tile completes its access.

In various embodiments, multiple multi-drop row buses in the X dimension may help to recover some of the lost bandwidth during congestion. When there is no congestion, frames flow from an input port to the destination tiles continuously; thus, only one row bus may be needed in this case since the bandwidth throughput may match between the input and the single row bus. When congestion occurs, the buffers at the receiving tiles may be backed up, eventually causing the sourcing input queues to be backed up and frames to accumulate in one or more input queues. However, with multiple multi-drop row buses in the X dimension, once the congestion dissipates, multiple queues may then "unload" frames to the multiple multi-drop row buses simultaneously, hence recovering some of the lost bandwidth.

In some embodiments, multiple tiles, multiple input ports, or multiple input queues may be coupled to one multi-drop row/column bus. As an example, tile 101 may have two input ports 111 and 113, and the two input ports may share one multi-drop row bus (e.g., 182) as well as one multi-drop column bus (e.g., 192). In some embodiments, one tile, one input port, or one input queue may be coupled to multiple multi-drop row/column buses. As an example, tile 107 may be coupled to two multi-drop row buses (e.g., 186 and 188) as well as two multi-drop column buses (e.g., 194 and 196). In some embodiments, one tile, one input port, or one input queue may be effectively coupled to a non-integer number of multi-drop row/column buses. As an example, tile 106 may be coupled to, thus may use multi-drop row buses 184 and/or 186. Meanwhile, tile 107 may be coupled to, thus may use multi-drop row buses 186 and/or 188. In this case, two input ports, two input queues, or two tiles may share three multi-drop row buses, which may yield an effective 1.5 times speedup in delivering frames to the next buffering point in the X-dimension for both tiles. By the same token, one tile, one input port, or one input queue may be coupled to a non-integer number of multi-drop column buses, and similarly provide a non-integer times speedup in the Y-dimension.

In various embodiments, one or more multi-drop column buses in the Y dimension routing may be used in switch 100, e.g., to reduce wire complexity in the Y-dimension routing. As an example, multi-drop column bus 192 may be used by tile 101 to forward frames to tile 104, tile 105, or other tiles in their column. In some embodiments, tile 104 or 105 may have its own respectively coupled multi-drop column bus (not shown) to forward frames from its input queue.

In various embodiments, multiple multi-drop column buses in the Y dimension may be coupled to and used by one tile or more specifically one input queue, e.g., to increase performance in the Y-dimension routing. As an example, multi-drop column buses 194 and 196 may be coupled to and used by tile 103 and input queue 132 thereof to forward frames to tile 106, 107, or other tiles in their column. In some embodiments, switch module 136 may determine, between multi-drop column buses 194 and 196, which multi-drop column bus may be used to forward frames from input queue 132. In other embodiments, arbiter 108 may perform the selection function to select multi-drop column bus 194 or 196 to forward frames from input queue 132. In various embodiments, output queues, e.g., 134, 164, or 174 may receive frames forwarded via their respectively coupled one or more multi-drop column buses.

In the X-dimension, when congestion occurs in one dimension, frames may be back-pressured into the input queue. When congestion eases, the multiple multi-drop buses may then quickly move multiple frames to their destination columns simultaneously, hence improving performance as compared to embodiments where only one multi-drop bus is provided.

In the Y-dimension, multiple multi-drop column buses may reduce wiring as well as maintain reasonable speed as compared to point-to-point buses. Although a set of point-to-point buses may provide non-blocking behavior where multiple inputs in a row can deliver frames simultaneously to multiple unique output ports in a column without conflict, point-to-point buses may introduce complications in a switch due to intensive wiring. An example of an 8-by-8 tile matrix switch would require 64 buses for each column if only using point-to-point routing structure in the Y-dimension. A smaller number of multi-drop column buses may be used to replace those 64 buses in this case. These multiple multi-drop column buses may still allow multiple inputs in a row to route frames to multiple outputs in a column simultaneously, but only a fraction of the column buses may be required. As for the 8-by-8 tile-matrix example, only 16 multi-drop column buses are needed if 2 multi-drop column buses are provided for each tile to route to the eight tiles in one column.

In some embodiments, one multi-drop column bus may be shared by multiple tiles to deliver the frames, which may reduce bandwidth and increase latency compared to point-to-point bus architecture. To increase bandwidth and reduce latency, multiple multi-drop column buses may be used in one column channel in some embodiments. As the radix of the switch continues to grow, the number of wires to implement column buses in a point-to-point fashion grows rapidly, thus making point-to-point schemes unsustainable. With many traffic patterns, multiple inputs in a row may need not simultaneously access multiple unique outputs in a column. Thus, it could be a reasonable tradeoff for using multiple multi-drop column buses in the Y-dimension to reduce the number of wires but still maintain a reasonable level of bandwidth and latency. Using multiple multi-drop buses in the Y-dimension may allow the possibility of extending the tile-matrix architecture to a much higher radix switch.

In various embodiments, frames may arrive at an input port of switch 100 and be buffered into an input queue if congestion occurs. Input queues may often be separated by virtual channels (VCs) for guaranteeing deadlock-free routing and for quality-of-service delivery purposes. These input queues may then arbitrate for access to utilize one or more multi-drop row buses to move frames out to a row of tiles in the X-dimension. As an example, input queue 172 may drive two multi-drop row buses to a row of tiles.

In various embodiments, multi-drop buses in switch 100 may provide performance gains. As an example, frames at the front of the different input queues (e.g., input queue 172 and 152) that are either on different VCs or destined to different tiles may allowed to be moved simultaneously using different multi-drop row buses to their destination tiles. As another example, frames at the same input queue may be moved simultaneously using multiple multi-drop buses to improve performance further.

In various embodiments, multi-drop buses in switch 100 may also be used to recover some deficiencies within the switch. For example, if an extra cycle on the bus is needed for having the routing information to precede the actual frame, this loss of efficiency may then be probabilistically recovered when a stream of frames are being forwarded to different columns using multiple multi-drop buses.

In various embodiments, a specific multi-drop row or column bus in switch 100 may be accessible by frames from various virtual channels. Thus, multi-drop row or column buses in switch 100 may have no virtual channel restrictions.

In various embodiments, multi-drop buses in switch 100 may also be used for multicast. In this multicast scenario, when a frame needs to be multicast to different output ports, multi-drop buses may be used for delivering this frame simultaneously to multiple output ports.

In various embodiments, multi-drop buses in switch 100 may also be used to recover some deficiencies that may be built into a switch. As an example, an internal data path in switch 100 may not able to handle frames with odd numbers of flits efficiently. This means if there is a stream of odd sized frames arriving an input port, the input port may have trouble keeping up sending them out with only a single bus, even without congestion. A multiple multi-drop bus scheme in this case may then speedup the switch process to recover from this deficiency and may even be able to match the throughput of the incoming rate if these frames are destined to different output ports.

Figure 2:
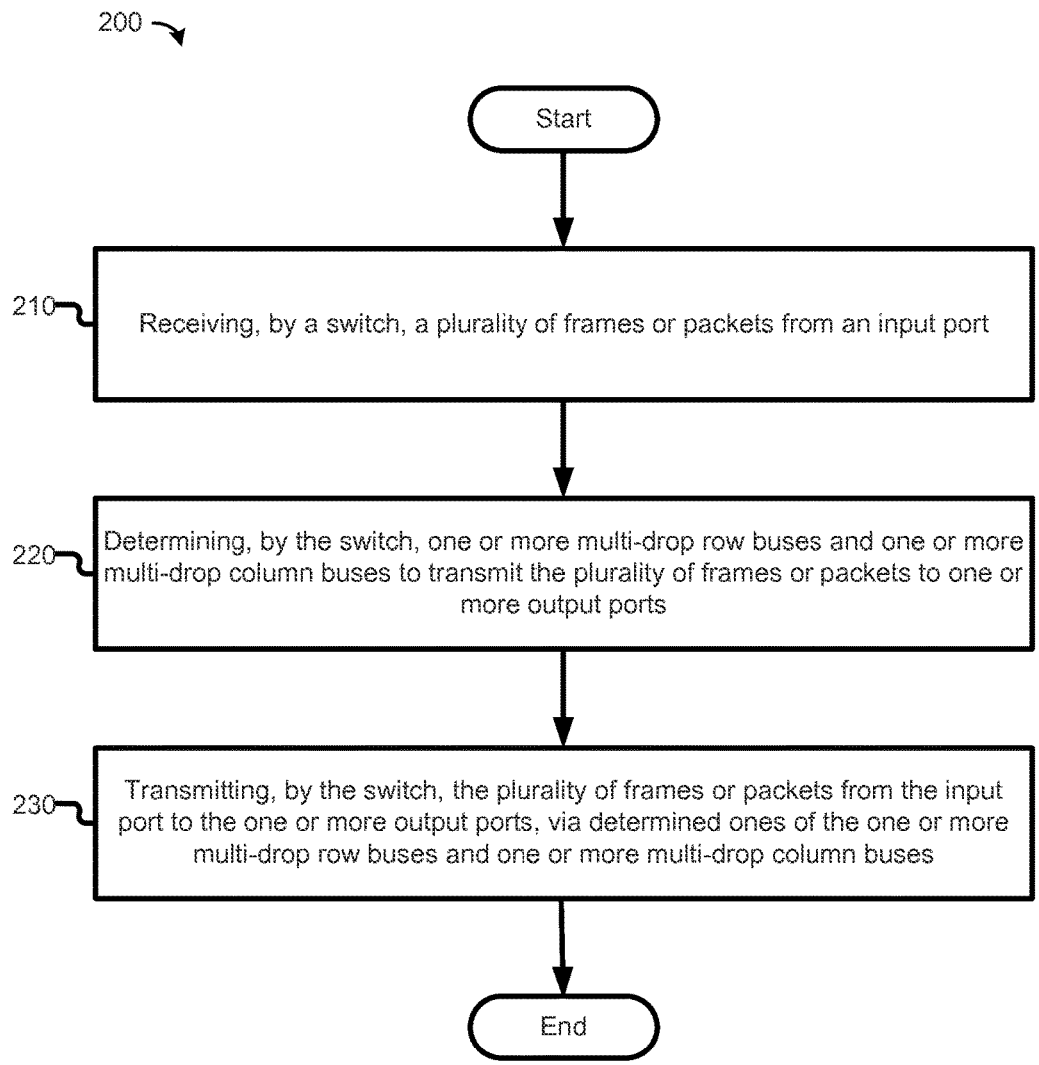
FIG. 2 is a flow diagram of an example process for using multiple multi-drop buses, which may be practiced by an example switch, incorporating aspects of the present disclosure, in accordance with various embodiments.

Referring now to FIG. 2, it is a flow diagram of an example process using multiple multi-drop buses, which may be practiced by, e.g., switch 100 of FIG. 1, in accordance with various embodiments. The process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to use multiple multi-drop buses in a switch. As such, process 200 may be performed by, e.g., switch 100 of FIG. 1, to implement one or more embodiments of the present disclosure. In embodiments, process 200 may be performed with more or less operations or with the operations in different order.

In embodiments, the process may begin at block 210, where a plurality of frames from an input port may be received, e.g., by switch 100 of FIG. 1. In some embodiments, the frames may all be sourced from one computing device. In other embodiments, the frames may be sent by different computing devices. In some embodiments, the frames may have odd numbers of flits.

Next, at block 220, one or more multi-drop row buses and one or more multi-drop column buses may be determined to transmit the plurality of frames to one or more output ports, e.g., by the switch. In some embodiments, the switch may determine one or more multi-drop row buses among at least two multi-drop row buses disposed in a same row to transmit these frames. Multiple multi-drop row buses may be used to enhance bandwidth and reduce latency to forward these frames to different columns in a matrix switch.

In some embodiments, the switch may determine one or more multi-drop row buses among at least two multi-drop row buses disposed in different rows to transmit these frames. Utilizing multiple multi-drop row buses from different rows may not only enhance bandwidth, but also allow non-integer times of speedup, e.g., 1.5 times when three multi-drop row buses are shared by two input ports or input queues.

In some embodiments, the switch may determine one or more multi-drop column buses among at least two multi-drop column buses disposed in a same column. Utilizing multiple multi-drop column buses in the Y-dimension may reduce the number of wires (e.g., compared to a point-to-point schema) thus to enable much higher radix in the tile-matrix architecture, but still maintain a reasonable level of bandwidth and latency (e.g., compared to a point-to-point schema).

Next, at block 230, the plurality of frames from the input port may be transmitted to the one or more output ports, e.g., by switch 100, via determined ones of the one or more multi-drop row buses and one or more multi-drop column buses. In some embodiments, a multi-drop row or column bus may be used to multicast the frames to multiple output ports.

Figure 3:
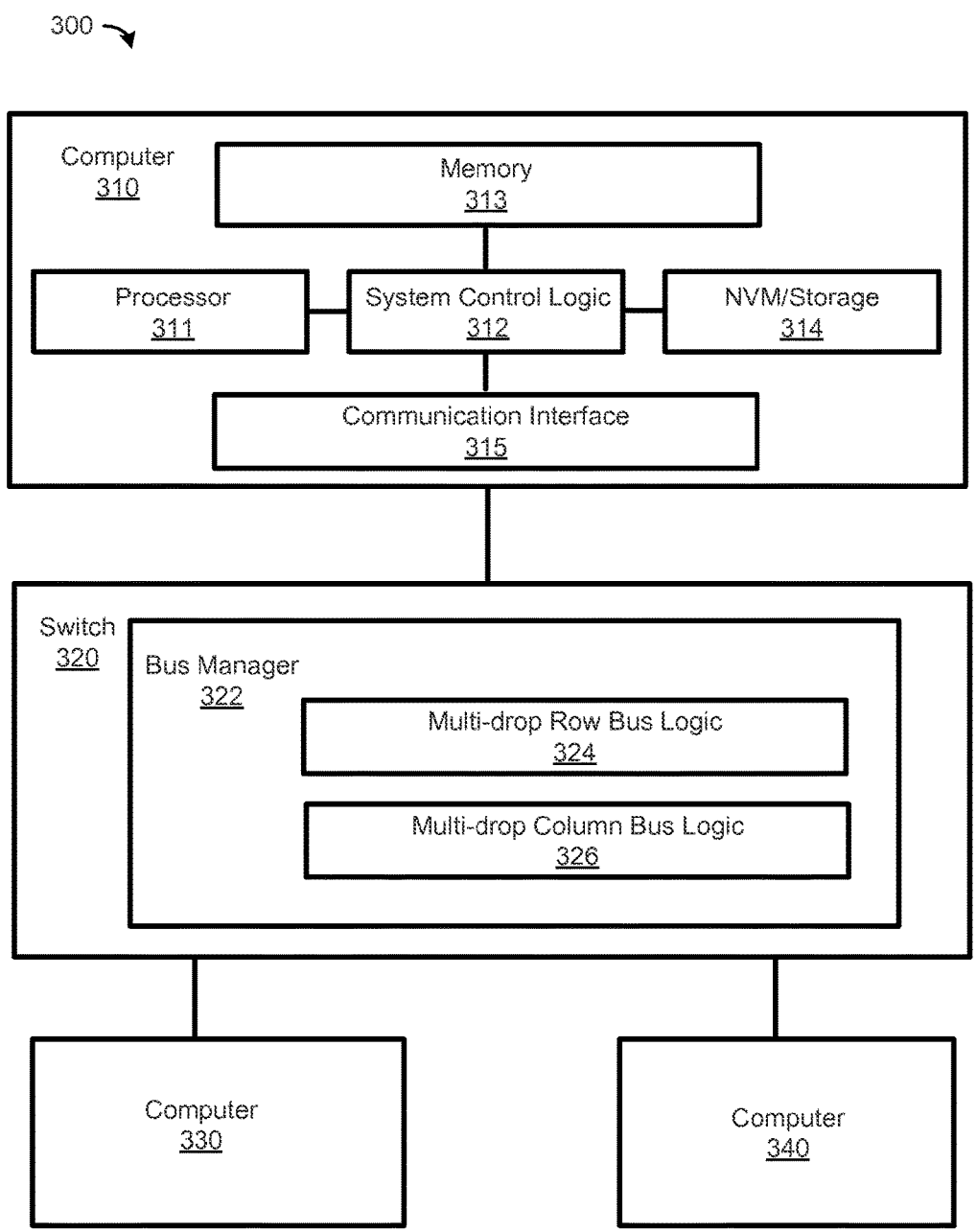
FIG. 3 illustrates example computing system suitable for practicing the disclosed embodiments, in accordance with various embodiments.

FIG. 3 illustrates an embodiment of computing system 300 (hereinafter "system 300") suitable for practicing embodiments of the present disclosure.

As shown, system 300 may include a plurality of computers, computer 310, 330, and 340; and a switch 320 coupled to the computers. Switch 320 may be used to forward or route frames among these computers via various data paths. In some embodiments, switch 320 may correspond to switch 100 described herein and/or may perform the method 200 described herein. Although only three computers are shown in FIG. 3, it will be appreciated that the network fabric or system 300, including switch 320, may be used to route data between any suitable number of computers.

In various embodiments, switch 320 may include bus manager 322 to manage multiple multi-drop buses in switch 320. Multi-drop row bus logic 324 may determine how to use one or more multi-drop row buses to transmit frames in the X-dimension, e.g., from one column to another. Similarly, multi-drop column bus logic 326 may determine one or more multi-drop column buses to transmit frames from in the Y-dimension, e.g., from one row to another. In some embodiments, bus manager 322 may use multi-drop row bus logic 324 prior to multi-drop column bus logic 326. Thus, frames may be forwarded in the X-dimension prior to the Y-dimension. In some embodiments, bus manager 322 may use multi-drop column bus logic 326 prior to multi-drop row bus logic 324. Thus, frames may be forwarded in the Y-dimension prior to the X-dimension. In some embodiments, bus manager 322 may alternatively use multi-drop row bus logic 324 and multi-drop column bus logic 326. Thus, frames may be forwarded in the X-dimension and the Y-dimension alternatively.

In some embodiments, multi-drop row bus logic 324 and multi-drop column bus logic 326 may be implemented in each sub-switch, e.g., within switch module 136 in FIG. 1. In other embodiments, multi-drop row bus logic 324 and multi-drop column bus logic 326 may be implemented in a separate component, e.g., within arbiter 108 in FIG. 1.

In various embodiments, computer 310 may include system control logic 312 coupled to processor 311, to system memory 313, to non-volatile memory (NVM)/storage 314, and to communication interface 315. In various embodiments, processor 311 may include one or more processors or processor cores.

In various embodiments, switch 320 may be coupled to the respective communication interface of computers 310, 330 and 340. Alternatively, or additionally, the switch 320 may be coupled to a plurality of processors of a single computer (e.g., computer 310) to route data between the processors (e.g., multiple processors in processor 311).

In various embodiments, communication interface 315 may provide an interface for computing device 310 to communicate over one or more network(s) and/or with any other suitable devices. Communication interface 315 may include any suitable hardware and/or firmware, such as a network adapter, a network interface card, one or more antennas, wireless interface(s), and so forth. In various embodiments, communication interface 315 may include multiple NICs for computing device 310, especially as a server, to use Ethernet technologies for LAN or WAN communication. NICs may manage coaxial, twisted pair, or fiber optic physical medium interfaces. A respective NIC may manage a respective Ethernet physical layer, such as 10BASE-T, 100BASE-TX, or 1000BASE-T.

In some embodiments, system control logic 312 may include any suitable interface controllers to provide for any suitable interface to the processor 311 and/or to any suitable device or component in communication with system control logic 312. System control logic 312 may also interoperate with a display (not shown) for the display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 312 may include one or more memory controller(s) (not shown) to provide an interface to system memory 313. System memory 313 may be used to load and store data and/or instructions, for example, for computing device 310. System memory 313 may include any suitable volatile memory, such as dynamic random access memory (DRAM), for example.

In some embodiments, system control logic 312 may include one or more input/output (I/O) controller(s) (not shown) to provide an interface to NVM/storage 314 and communication interface 315. NVM/storage 314 may be used to store data and/or instructions, for example. NVM/storage 314 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 314 may include a storage resource that is physically part of a device on which computing device 310 is installed or it may be accessible by, but not necessarily a part of, computing device 310. For example, NVM/storage 314 may be accessed by computing device 310 over a network via communication interface 315.

In some embodiments, processor 311 may be packaged together with memory having system control logic 312. In some embodiments, at least one of the processor(s) 311 may be packaged together with memory having system control logic 312 to form a System in Package (SiP). In some embodiments, processor 311 may be integrated on the same die with memory having system control logic 312 to form a System on Chip (SoC). In some embodiments, a switch, e.g., switch 100, may be integrated as an element of a SoC that includes the switch and one or more processors. Certainly, in other embodiments, a switch, e.g., switch 100, may be a stand-alone switch.

As will be appreciated by one skilled in the art, the present disclosure may be embodied as methods or computer program products. Accordingly, the present disclosure, in addition to being embodied in hardware as earlier described, may at least in part take the form of an embodiment combining software (including firmware, resident software, microcode, etc.) and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 4:
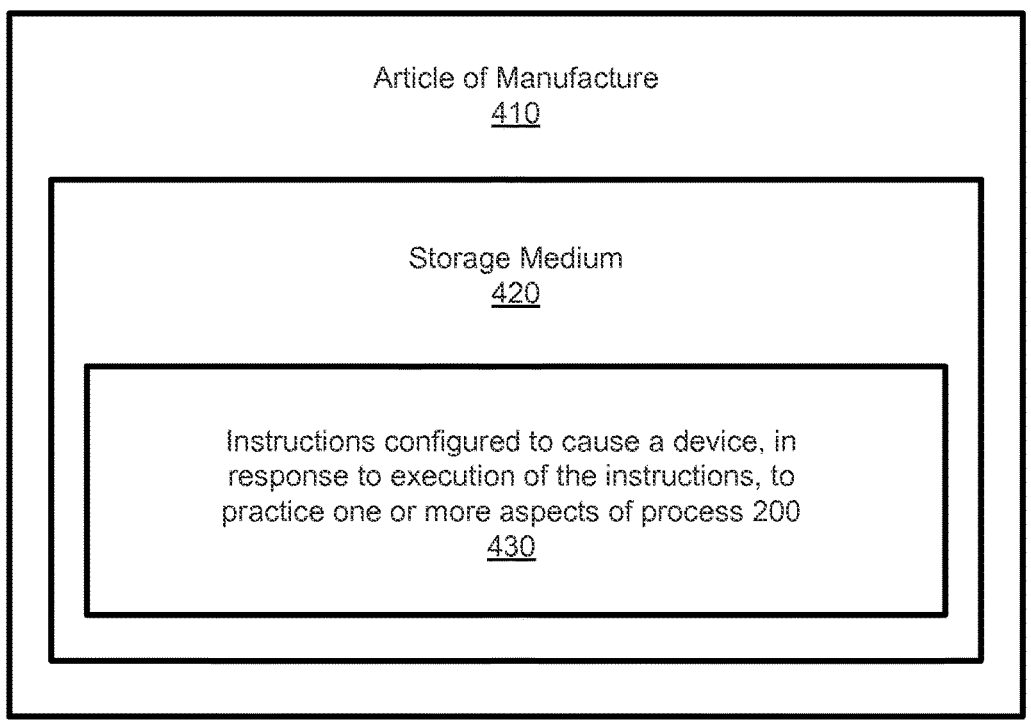
FIG. 4 illustrates an article of manufacture having programming instructions, incorporating aspects of the present disclosure, in accordance with various embodiments.

FIG. 4 illustrates an article of manufacture 410 having programming instructions, incorporating aspects of the present disclosure, in accordance with various embodiments. In various embodiments, an article of manufacture may be employed to implement various embodiments of the present disclosure. As shown, the article of manufacture 410 may include a computer-readable non-transitory storage medium 420 where instructions 430 are configured to practice embodiments of or aspects of embodiments of any one of the processes described herein. The storage medium 420 may represent a broad range of persistent storage media known in the art, including but not limited to flash memory, dynamic random access memory, static random access memory, an optical disk, a magnetic disk, etc. Instructions 430 may enable an apparatus, in response to their execution by the apparatus, to perform various operations described herein. As an example, storage medium 420 may include instructions 430 configured to cause an apparatus, e.g., switch 100 of FIG. 1, to practice some aspects of using multiple multi-drop buses in the apparatus, e.g., as illustrated in process 200 of FIG. 2, in accordance with embodiments of the present disclosure.

In embodiments, computer-readable storage medium 420 may include one or more computer-readable non-transitory storage media. In other embodiments, computer-readable storage medium 420 may be transitory, such as signals, encoded with instructions 430. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

The present disclosure is described with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions, e.g., by instruction 430. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In various embodiments, instructions 430 may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. In various embodiments, instructions 430 may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specify the presence of stated features, integers, procedures, operations, elements, and/or components, but do not preclude the presence or addition of one or more other features, integers, procedures, operation, elements, components, and/or groups thereof. Furthermore, the terms "comprising," "including," "having," and the like, as used with respect to embodiments of the present disclosure, are synonymous.

Embodiments may be implemented as a computer process, a computing system or as an article of manufacture such as a computer program product of computer readable media. The computer program product may be a computer storage medium readable by a computer system and encoded with computer program instructions for executing a computer process. The corresponding structures, material, acts, and equivalents of all means plus function elements in the claims below are intended to include any structure, material or act for performing the function in combination with other claimed elements that are specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments discussed herein were chosen and described in order to illustrate the principles of the disclosure and the practical application, and to enable others of ordinary skill in the art to understand the disclosure for embodiments with various modifications as are suited to the particular use contemplated.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Some non-limiting Examples of various embodiments are presented below.

Example 1 is a matrix switch for computing, which may include a multi-drop row bus to transmit a plurality of frames in a row dimension of the matrix switch; a multi-drop column bus, coupled to the multi-drop row bus, to transmit the plurality of frames in a column dimension of the matrix switch; an input port, coupled to the multi-drop row bus or the multi-drop column bus, to receive the plurality of frames; and an output port, coupled to the multi-drop row bus or the multi-drop column bus, to output the plurality of frames from the matrix switch.

Example 2 may include the subject matter of Example 1, and may further include an input queue, coupled to the input port, to buffer the plurality of frames; and an output queue, coupled to the output port, to buffer the plurality of frames.

Example 3 may include the subject matter of Example 1 or 2, and may further specify that the multi-drop row bus is a first multi-drop row bus, the matrix switch may further include a second multi-drop row bus, coupled to the input port, to transmit the plurality of frames in the row dimension of the matrix switch; and an arbiter, coupled to the first and second multi-drop row buses, to select the first or second multi-drop row bus to transmit the plurality of frames.

Example 4 may include the subject matter of Example 3, and may further specify that the first multi-drop row bus and the second multi-drop row bus share a same row of the matrix switch.

Example 5 may include the subject matter of Example 3, and may further specify that the first multi-drop row bus and the second multi-drop row bus are in different rows of the matrix switch.

Example 6 may include any subject matter of Examples 1-5, and may further specify that the input port is a first input port. The matrix switch may further include a second input port, wherein the second input port shares a same row with the first input port or is in a different row from the first input port, wherein the second input port is to share the multi-drop row bus with the first input port.

Example 7 may include any subject matter of Examples 1-6, and may further specify that the multi-drop column bus is a first multi-drop column bus. The matrix switch may further include a second multi-drop column bus, coupled to the output port, to transmit the plurality of frames in the column dimension of the matrix switch; and an arbiter, coupled to the first and second multi-drop column buses, to select the first or second multi-drop column bus to transmit the plurality of frames.

Example 8 may include the subject matter of Example 7, and may further specify that the first multi-drop column bus and the second multi-drop column bus share a same column of the matrix switch.

Example 9 may include the subject matter of Example 7, and may further specify that the first multi-drop column bus and the second multi-drop column bus are in different columns of the matrix switch.

Example 10 may include any subject matter of Examples 1-9, and may further specify that the output port is a first output port. The matrix switch may further include a second output port, wherein the second output port shares a same column with the first output port or is in a different column from the first output port, wherein the second output port is to share the multi-drop column bus with the first output port.

Example 11 may include any subject matter of Examples 1-10, and may further specify that the matrix switch is an element of a system on chip (SoC) that includes the matrix switch and one or more processors.

Example 12 may include any subject matter of Examples 1-11, and may further specify that the multi-drop column bus is to multicast the plurality of frames to a plurality of output ports of the matrix switch.

Example 13 is a method for computer networking, which may include receiving, by a matrix switch, a plurality of frames from an input port; determining, by the matrix switch, one or more multi-drop row buses and one or more multi-drop column buses to transmit the plurality of frames to one or more output ports; and transmitting, by the matrix switch, the plurality of frames from the input port to the one or more output ports, via determined ones of the one or more multi-drop row buses and one or more multi-drop column buses.

Example 14 may include the subject matter of Example 13, and may further specify that the receiving comprises receiving the plurality of frames having odd numbers of flits.

Example 15 may include the subject matter of Example 13 or 14, and may further specify that the determining comprises determining one or more multi-drop row buses among at least two multi-drop row buses disposed in a same row.

Example 16 may include any subject matter of Examples 13-15, and may further specify that the determining comprises determining one or more multi-drop row buses among at least two multi-drop row buses disposed in different rows.

Example 17 may include any subject matter of Examples 13-16, and may further specify that the determining comprises determining one or more multi-drop column buses among at least two multi-drop column buses disposed in a same column.

Example 18 may include any subject matter of Examples 13-17, and may further specify that the transmitting comprises multicasting, by the matrix switch, the plurality of frames to a plurality of output ports.

Example 19 is at least one non-transient computer-readable storage medium, which may include a plurality of instructions configured to cause an apparatus, in response to execution of the instructions by the apparatus, to practice any subject matter of Examples 13-18.

Example 20 may be an apparatus for computer networking. The apparatus may include means for means for receiving a plurality of frames from an input port; means for determining one or more multi-drop row buses and one or more multi-drop column buses to transmit the plurality of frames to one or more output ports; and means for transmitting the plurality of frames from the input port to the one or more output ports, via determined ones of the one or more multi-drop row buses and one or more multi-drop column buses.

Example 21 may include the subject matter of Example 20, and may further specify that the means for receiving comprises means for receiving the plurality of frames having odd numbers of flits.

Example 22 may include the subject matter of Example 20 or 21, and may further specify that the means for determining comprises means for determining one or more multi-drop row buses among at least two multi-drop row buses disposed in a same row.

Example 23 may include any subject matter of Examples 20-22, and may further specify that the means for determining comprises means for determining one or more multi-drop row buses among at least two multi-drop row buses disposed in different rows.

Example 24 may include any subject matter of Examples 20-23, and may further specify that the means for determining comprises means for determining one or more multi-drop column buses among at least two multi-drop column buses disposed in a same column.

Example 25 may include any subject matter of Examples 20-24, and may further specify that the means for transmitting comprises means for multicasting the plurality of frames to a plurality of output ports.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A matrix switch for computer networking, comprising:
a first tile, a second tile, a third tile, a fourth tile, and a fifth tile with the first, third and fourth tiles arranged in a row dimension of the matrix switch, and the first, second, and fifth tiles arranged in a column dimension of the matrix;
a multi-drop row bus coupled to the first tile, the third tile, and the fourth tile in the row dimension to transmit a plurality of frames among the first tile, the third tile, or the fourth tile in the row dimension of the matrix switch;
a first multi-drop column bus, coupled to the multi-drop row bus, the first tile, the second tile, and the fifth tile, to transmit the plurality of frames in the column dimension of the matrix switch;

a second multi-drop column bus, coupled to the multi-drop row bus, the first tile, the second tile, and the fifth tile, to transmit the plurality of frames in the column dimension;

an input port of the first tile, coupled to the multi-drop row bus, the first multi-drop column bus, or the second multi-drop column bus, to receive the plurality of frames; and an output port of Hall the second tile, coupled to the multi-drop row bus, the first multi-drop column bus, or the second multi-drop column bus, to output the plurality of frames from the matrix switch.

2. The matrix switch according to claim 1, further comprising:

an input queue of the first tile, coupled to the input port, to buffer the plurality of frames; and an output queue of the second tile, coupled to the output port, to buffer the plurality of frames.

3. The matrix switch according to claim 1, wherein the multi-drop row bus is a first multi-drop row bus, the matrix switch further comprising:

a second multi-drop row bus, coupled to the input port, to transmit the plurality of frames in the row dimension of the matrix switch; and an arbiter, coupled to the first and second multi-drop row buses, to select the first or second multi-drop row bus to transmit the plurality of frames.

4. The matrix switch according to claim 3, wherein the first multi-drop row bus and the second multi-drop row bus share a same row of the matrix switch.

5. The matrix switch according to claim 3, wherein the first multi-drop row bus and the second multi-drop row bus are in different rows of the matrix switch.

6. The matrix switch according to claim 1, wherein the input port is a first input port, the matrix switch further comprising:

a second input port, wherein the second input port shares a same row with the first input port or is in a different row from the first input port, and wherein the second input port is to share the multi-drop row bus with the first input port.

7. The matrix switch according to claim 1, further comprising an arbiter, coupled to the first and second multi-drop column buses, to select the first or second multi-drop column bus to transmit the plurality of frames.

8. The matrix switch according to claim 7, wherein the first multi-drop column bus and the second multi-drop column bus share a same column of the matrix switch.

9. The matrix switch according to claim 7, wherein the first multi-drop column bus and the second multi-drop column bus are in different columns of the matrix switch.

10. The matrix switch according to claim 1, wherein the output port is a first output port, the matrix switch further comprising:

a second output port, wherein the second output port shares a same column with the first output port or is in a different column from the first output port, wherein the second output port is to share the first multi-drop column bus or the second multi-drop column bus with the first output port.

11. The matrix switch according to claim 1, wherein the matrix switch is an element of a system on chip (SoC) that includes the matrix switch and one or more processors.

12. The matrix switch according to claim 1, wherein the first multi-drop column bus or the second multi-drop column bus is to multicast the plurality of frames to a plurality of output ports of the matrix switch.

13. A method for computer networking, comprising:

receiving, by a matrix switch, a plurality of frames from an input port;

determining, by the matrix switch, one or more multi-drop row buses and one or more multi-drop column buses to transmit the plurality of frames to one or more output ports, wherein the matrix switch includes at least a multi-drop row bus coupled to a first tile, a second tile, and a third tile in a row dimension; a first multi-drop column bus coupled to the multi-drop row bus, the first tile, a fourth tile, and a fifth tile, to transmit the plurality of frames in a column dimension of the matrix switch; and a second multi-drop column bus, coupled to the multi-drop row bus, the first tile, the fourth tile, and the fifth tile, to transmit the plurality of frames in the column dimension; and transmitting, by the matrix switch, the plurality of frames from the input port to the one or more output ports, via determined ones of the one or more multi-drop row buses and one or more multi-drop column buses.

14. The method of claim 13, wherein the receiving comprises receiving the plurality of frames having odd numbers of flits.

15. The method of claim 13, wherein the determining comprises determining one or more multi-drop row buses among at least two multi-drop row buses disposed in a same row.

16. The method of claim 13, wherein the determining comprises determining one or more multi-drop row buses among at least two multi-drop row buses disposed in different rows.

17. The method of claim 13, wherein the determining comprises determining one or more multi-drop column buses among at least two multi-drop column buses disposed in a same column.

18. The method of claim 13, wherein the transmitting comprises multicasting, by the matrix switch, the plurality of frames to a plurality of output ports.

19. One or more non-transitory computer readable medium (CRM) having a plurality of instructions to cause a matrix switch, in response to execution of the instructions, to:

receive a plurality of frames from an input port;

determine one or more multi-drop row buses and one or more multi-drop column buses to transmit the plurality of frames to one or more output ports, wherein the matrix switch includes at least a multi-drop row bus coupled to a first tile, a second tile, and a third tile in a row dimension; a first multi-drop column bus coupled to the multi-drop row bus, the first tile, a fourth tile, and a fifth tile, to transmit the plurality of frames in a column dimension of the matrix switch; and a second multi-drop column bus, coupled to the multi-drop row bus, the first tile, the fourth tile, and the fifth tile, to transmit the plurality of frames in the column dimension; and transmit the plurality of frames from the input port to the one or more output ports, via determined ones of the one or more multi-drop row buses and one or more multi-drop column buses.

20. The one or more non-transitory CRM of claim 19, wherein to receive comprises to receive the plurality of frames having odd numbers of flits.

21. The one or more non-transitory CRM of claim 19, wherein to determine comprises to determine one or more multi-drop row buses among at least two multi-drop row buses disposed in a same row.

22. The one or more non-transitory CRM of claim 19, wherein to determine comprises to determine one or more multi-drop row buses among at least two multi-drop row buses disposed in different rows.

23. The one or more non-transitory CRM of claim 19, wherein to determine comprises to determine one or more multi-drop column buses among at least two multi-drop column buses disposed in a same column.

24. The one or more non-transitory CRM of claim 19, wherein to transmit comprises to multicast the plurality of frames to a plurality of output ports.

* * * * *